US012456035B2

(12) United States Patent
Zuo et al.

(10) Patent No.: US 12,456,035 B2
(45) Date of Patent: Oct. 28, 2025

(54) NEURAL NETWORKS GRAPH PARTITIONING SYSTEM AND METHOD FOR THE SAME

(71) Applicant: Black Sesame Technologies Inc., San Jose, CA (US)

(72) Inventors: Wei Zuo, Cupertino, CA (US); Qiang Zhang, Campbell, CA (US); Chenhao Fang, Sunnyvale, CA (US); Zheng Qi, Cupertino, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 972 days.

(21) Appl. No.: 17/545,799

(22) Filed: Dec. 8, 2021

(65) Prior Publication Data

US 2023/0177311 A1 Jun. 8, 2023

(51) Int. Cl.
*G06N 3/045* (2023.01)
*G06F 17/18* (2006.01)

(52) U.S. Cl.
CPC ............ *G06N 3/045* (2023.01); *G06F 17/18* (2013.01)

(58) Field of Classification Search
CPC ................................ G06N 3/045; G06F 17/18
USPC .......................................................... 706/27
See application file for complete search history.

(56) References Cited

U.S. PATENT DOCUMENTS

| 2006/0053287 | A1* | 3/2006 | Kitamura | G06F 11/1076 |
| | | | | 714/E11.034 |
| 2009/0040080 | A1* | 2/2009 | Hwang | H04N 19/147 |
| | | | | 341/51 |
| 2012/0124134 | A1* | 5/2012 | Dey | G06Q 10/10 |
| | | | | 709/204 |
| 2021/0264251 | A1* | 8/2021 | Kalluri | G06N 3/08 |
| 2022/0066834 | A1* | 3/2022 | Wolfe | G06F 9/5027 |

FOREIGN PATENT DOCUMENTS

CN 112236783 A * 1/2021 ............. G06F 17/15

OTHER PUBLICATIONS

A Gentle Introduction to Graph Neural Networks, Sanchez, https://distill.pub/2021/gnn-intro/, Sep. 2, 2021 (Year: 2021).*

* cited by examiner

*Primary Examiner* — Austin Hicks
(74) *Attorney, Agent, or Firm* — Timothy T. Wang; Ni, Wang & Massand, PLLC

(57) ABSTRACT

The present invention discloses a graph partitioning system for running neural networks on resource constrained hardware systems. The graph partitioning system used for partitioning a neural network graph into a series of sub-graphs and further allow the multiple sub-graphs to be executed in available hardware subsystems. The system based on cost function as estimated computation time and memory bandwidth of partitioned sub-graphs. The graph partitioning system is a cycle estimation model of hardware that can run fast and parameterize memory latency. The graph partitioning system supports heterogeneous partition for different type accelerators such as CPU, GPU, ASIC. The present invention also discloses a method for partitioning neural network graph in to series of sub-graphs.

7 Claims, 3 Drawing Sheets

NEURAL NETWORKS GRAPH PARTITIONING SYSTEM AND METHOD FOR THE SAME

FIELD OF INVENTION

The present invention in general relates to field of neural networks. More specifically, the present invention relates to a system and method for partitioning a graph into a series of sub-graphs for running neural networks on resource constrained hardware systems.

BACKGROUND OF THE INVENTION

With the increased use of neural networks in the environment of ubiquitous micro-computing may lead to resource limitations with respect to computational processing power and memory for a platform. Often, artificial intelligence chips may not be capable of loading an entire graph onto the chip, as in the case of a large node, for example, a convolutional network with high depth. One possible solution for running neural networks on resource constrained hardware systems may be to segment the original neural network graph into multiple sub-graphs and allow the multiple sub-graphs to be executed available subsystems. Graph partitioning may provide a possible solution for resource limited artificial intelligence applications.

The motivation for the designing the graph partition algorithms based on multiple factors. The first factor is requirement of different operators that need to be run on different hardware backend such as Array, DSP etc. The second factor is to cut the large graph into multiple small sub-graphs. Therefore, those sub-graphs can meet hardware limitations. The last factor is to design decide the execution order of those sub-graphs on the resource constrained hardware systems.

With the increase of size of neural networks, optimizing neural network inference on a resource-confined embedded device is a challenging problem. Due to the hardware limitation of computational power and memory, it requires careful partition of the neural network model graph into small sub-graphs and split the computation into small chunks that can be efficiently executed on hardware so that the overall processing is optimized in terms of inference time, memory bandwidth and memory footprint, hence also power consumption.

The optimization of the graph partitioning deals with the multiple effects as described. The first factor is variations of model topology impacts hardware computation sequencing. The second factor is hardware restrictions on operation support and limitations of internal buffers for model parameters. The third factor is available graph partitioning algorithms impacts non-ideal external DDR memory access. The fourth factor is that generalization of graph partitioning optimization approaches required for different models, rather than a single model. The last factor is that graph partition optimization affects parameter values mutually. The net effect of these factors is that there exists a very large search and optimization space that cannot described easily with a parametric formula-based approach for graph partitioning.

Graph partitioning and its optimization performed by several alternative approaches as described. The first known approach for graph partitioning is manual approach. This approach based on the configuration that has the boundaries information of the graph. This approach requires the experience and understanding of hardware limitations, manually determine how to partition graph into sub-graphs and determine strip size based on tensor shape. The limitation of this approach is that this approach is non-scalable and tedious.

The second known approach for graph partitioning is parametric formula based approach. In this approach, a graph partitioned into sub-graphs based on a global parametric formula. The limitation of this approach is that the formula is globally applied and sub-optimal. The other limitation is that the formula is order dependent and conflicting. The third approach for partitioning graph is extreme partition approach. This approach based on the configuration that has the node information of the graph. In this approach, a graph is partitioned into sub-graphs with each sub-graph contains just one node. In this approach, the number of nodes in the original graph is equal to the number of partitioned sub-graphs. The limitation of this approach is that utilization of hardware is too low.

The fourth approach for graph partitioning is dynamic programming partition. This approach based on availability of sub-graph checker. In this approach, sub-graph checker function used to check the rules that validate the sub-graph. By using dynamic programming algorithm, the sub-graphs' start and end. The limitation of this approach time complexity is high due to the usage of dynamic programming algorithm. The last approach for graph partitioning is exhaustive search approach. In this approach, graph partitioning performed by trying out all parameters values associated with partitioning of graph. The limitation of this approach, this approach requires real hardware or cycle accurate model. The search space is also too large.

A number of prior arts available that describes graph partitioning approach in detail. A U.S. Pat. No. 8,364,615 assigned to Microsoft Corp discloses a local graph partitioning using an evolving set process. In this patent, a transitioning algorithm can expand or contract the analyzed set of vertices based on characteristics of vertices at a boundary of the analyzed set. Accordingly, as the set of analyzed vertices becomes large, significant processing efficiency gained by employing the characteristics of boundary vertices to transition the set or determine conductance, rather than all vertices of the analyzed set. Although the transitioning algorithm described herein segment the graph based on vertices. However, the patent described herein lacks speed and efficiency on resource constraint hardware.

Another U.S. Publication 20190266191 assigned to Huawei Technologies Co Ltd discloses a method for graph partitioning. In this patent, the edges in a graph randomly allocated to different devices. Although the method achieves relatively high graph partitioning efficiency. Nevertheless, the patent has disadvantage that the method described herein requires real hardware or cycle accurate model for execution of sub-graphs.

Thus, it would be desirable to design a multi-phase graph partitioning system for partitioning a graph into series of multiple graphs and allow the multiple sub-graphs to be executed available subsystems such as resource constraint hardware. It is desirable a graph partitioning approach that solves resource limited artificial intelligence applications.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need for an efficient and multi-phase graph partitioning system that support heterogeneous partition for different type accelerators such as CPU, processors, Chips etc and provides a best hardware utilization rate to a user.

SUMMARY OF THE INVENTION

In accordance with the present invention, the disadvantages and limitations of the prior art are substantially avoided by providing a multi-phase neural network graph partitioning system for running neural networks on resource constrained hardware systems. The neural network graph partitioning system includes a list-creating unit configured for creating a white list and a black list. The list-creating unit includes details of partition boundaries, a white list and a black list with respect to the neural network-based graph.

The neural network graph partitioning system further includes a node-generating unit configured for applying hard cuts of graph boundary for generating multiple nodes in the black list and the white list. The nodes in the black list represent a partition boundary. The neural network graph partitioning system further includes an optimizing unit configured for applying optimization grouping in multiple nodes in the white list. The optimizing unit applies optimization for known good partition points.

The neural network graph partitioning system further includes a partition-creating unit configured for making a partition of the neural network-based graph based on cost function defined and internal memory limitation of the hardware. The partition-creating unit generates a partition boundary within the neural network graph based on cost function between the two nodes of the neural network-based graph.

The partition-creating unit further assigns a lowest cost route between the two nodes among multiple nodes. The partition-creating unit generates a multiple partition path sorted by the cost function between multiple nodes. The neural network graph partitioning system further includes a sub-graph generator configured for generating multiple sub-graph based on the partition path sorted based on cost function or cost values.

The neural network graph partitioning system further includes a sub-graph optimizer configured for optimizing the sub-graph by search hyper-parameter computational node limit in the sub-graph. The sub-graph optimizer further assigns at least single assignment workflows to the multiple sub-graph depending upon selection of scheduling parameters.

A primary objective of the present invention is to provide a system for partitioning neural network graph into a series of sub-graph that supports heterogeneous partition for different type accelerators such as CPU, GPU, ASIC, accelerators integrated circuits, digital signal processor, microprocessor chip, neural network chips, or Artificial intelligence chips.

Another objective of the present invention is to provide a multiphase system for partitioning neural network graph based on cost function that defines as estimated computation time and memory bandwidth of partitioned sub-graph.

Another objective of the present invention is to provide a system for partitioning neural network graph that provides best hardware utilization rate to a user and defines a cycle estimation model of hardware that can run fast and parameterize memory latency.

Another objective of the present invention is to provide a system for partitioning neural network graph that meet hardware limitation automatically, find best possible partition schemas, and report the best one to the user.

Other objective of the present invention is to provide a cost-function based system for partitioning neural network graph that has lower time complexity as compared to complex algorithms like dynamic programming partition algorithm.

Yet another objective of the present invention is to provide a system for graph partitioning that provide a possible solution for resource limited artificial intelligence applications.

In preferred embodiment of the present invention, the system for partitioning neural network graph splits the computation into small graphs or sub-graphs that can be efficiently executed on hardware so that the overall processing of the hardware is optimized in terms of inference time, memory bandwidth and memory footprint, hence also power consumption.

In one embodiment of the present invention, the system for partitioning neural network graph provides optimized graph partition support to neural network chip, artificial intelligence chip and different type accelerators such as CPU, GPU, ASIC, integrated circuits, digital signal processor, and microprocessor chip.

In one another embodiment of the present invention, the system for partitioning neural network graph that meets hardware limitation automatically. The system for partitioning neural network graph into series of sub-graph for running neural networks on resource-constrained hardware systems segment the original neural network graph into multiple sub-graphs and allow the multiple sub-graphs to be executed available subsystems.

In one another embodiment of the present invention, a method for partitioning a neural network graph into a series of sub-graphs described. The method includes a step of obtaining a neural network graph from a neural network chip or an artificial intelligence chip. The method further includes a step of a listing of a white list and a black list, partition boundary with respect to the neural network graph.

The method further includes a step of applying hard cuts of graph boundary for generating multiple nodes in the black list and the white list. The method further includes a step of optimization grouping of the multiple nodes in the white list and the black list for known good partition points. The method further includes a step of partitioning by generating a partition boundary within the within the neural network graph based on cost function between the two nodes.

The method further includes a step of calculating a lowest cost route between a start node and any end node in a sub-graph. The method further includes a step of assigning lowest cost route between the two nodes among multiple nodes. The method further includes generating multiple partition path sorted by the cost function between the multiple nodes. The method further includes a step of generating multiple sub-graph based on the partition path sorted by the cost function between the multiple nodes. The method further includes a step of assigning single assignment workflows to the respective sub-graph upon selection of scheduling parameters.

Embodiments of the present invention may employ any or all of the exemplary aspects above. Those skilled in the art will further appreciate the above-noted features and advantages of the invention together with other important aspects thereof upon reading the detailed description that follows in conjunction with the drawings, which illustrate, by way of example, the features in accordance with embodiments of the invention. The summary is not intended to limit the scope of the invention, which is defined solely by the claims attached hereto. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

The present invention provides a multi-phase and cost function based parameter search with loose design constraint neural network graph partitioning system. The neural network graph partitioning system for running neural networks on resource constrained hardware systems. The system segment the original neural network graph into multiple sub-graphs and allow the multiple sub-graphs to be executed available subsystems. The system for partitioning neural network graph provides optimized graph partition support to neural network chip, artificial intelligence chip and different type accelerators such as CPU, GPU, ASIC, integrated circuits, digital signal processor, and microprocessor chip.

Figure 1:
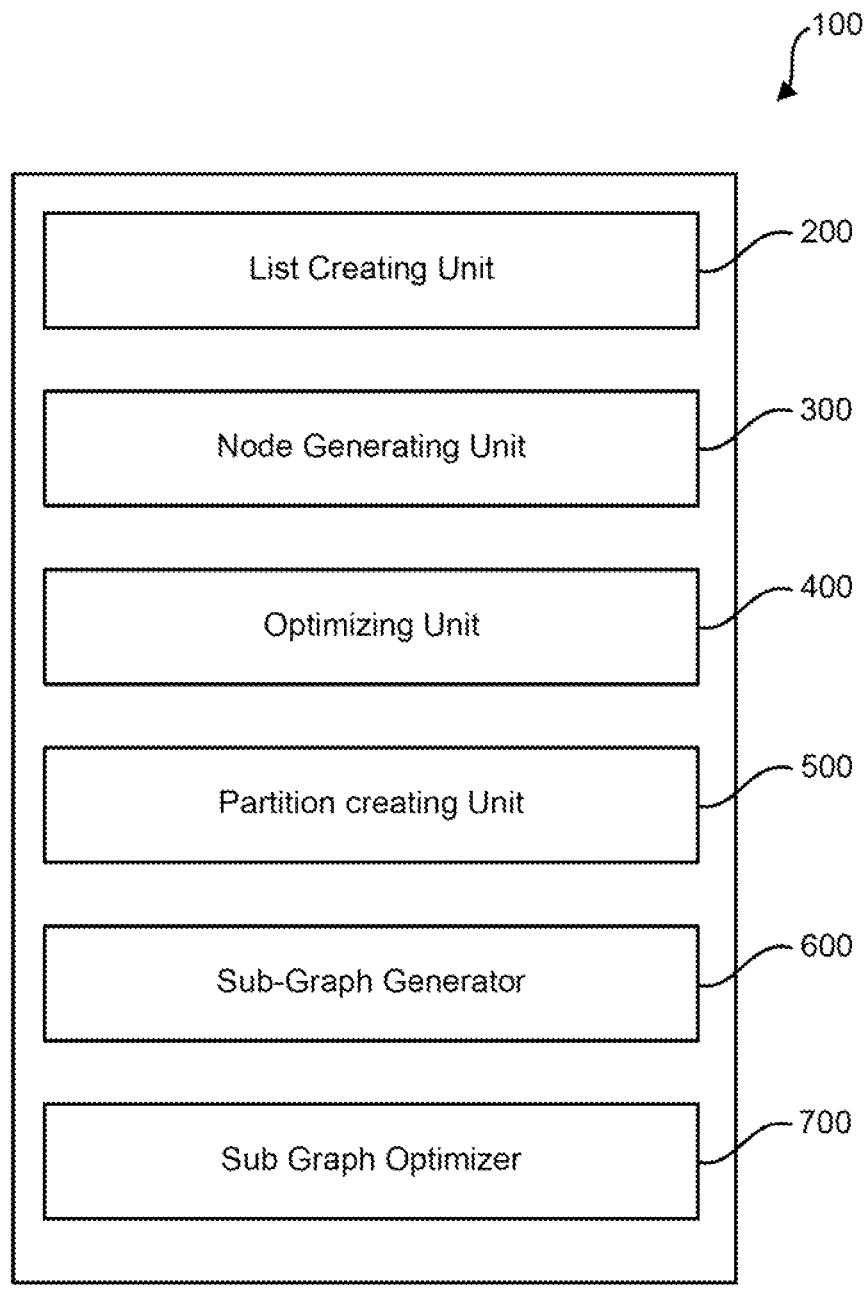
FIG. 1 illustrates a neural network graph partitioning system for partitioning graph into a series of sub-graphs in accordance with present invention.

FIG. 1 illustrates a neural network graph partitioning system for partitioning graph into a series of sub-graphs in accordance with present invention. A multi-phase system (100) for partitioning a neural network graph into a series of multiple sub-graphs described. The system (100) includes a list-creating unit (200) configured for creating a white list and a black list. The list-creating unit (200) includes details of partition boundaries, a white list and a black list with respect to the neural network-based graph to be segmented or partitioned.

The system (100) for partitioning a neural network graph further includes a node-generating unit (300) configured for applying hard cuts of graph boundary for generating multiple nodes in the black list and the white list. The nodes in the black list represent a partition boundary.

The system (100) for partitioning a neural network graph further includes an optimizing unit (400) configured for applying optimization grouping in multiple nodes in the white list. The optimizing unit applies optimization for known good partition points. According to the white list rules, the nodes in the white list cannot be considered as graph partition boundary.

The system (100) for partitioning a neural network graph further includes a partition-creating unit (500) configured for making a partition of the neural network-based graph based on cost function defined and internal memory limitation of the hardware. The partition-creating unit (500) generates a partition boundary within the neural network graph based on cost function between the two nodes of the neural network-based graph. The cost function defined as estimated computation time and memory bandwidth of partitioned sub-graph.

By using such cost function, it is easy to calculate the lowest cost between a start node and any end node in a sub-graph. By using efficient sorting algorithm, we can get the lowest cost for any node. The idea of the algorithm is to calculate the lowest cost route beginning from a starting point to any end node, and to exclude longer distances when making an update. The partition-creating unit (500) further assigns a lowest cost route between the two nodes among multiple nodes. The partition-creating unit (500) generates a multiple partition path sorted by the cost function between multiple nodes.

In one embodiment of the present invention, the partition-creating unit (500) based on graph costfunc partition algorithm generates all the cost between two nodes generated by the node generating unit (200). Firstly, the looping starts from the first node, it will loop all the remaining N-1 nodes. Further, the current cost corresponding for each node from node 0 is saved in the database.

The partition-creating unit (500) based on graph costfunc partition algorithm again starts loop start from the second node, and loop all the remaining N-2 nodes and further identifies current cost corresponding for each node. For each node, the partition-creating unit (500) compares current cost with the saved cost and gets a sorted partition path with lowest cost.

The partition-creating unit (500) based on graph costfunc partition algorithm loops to the last node of the graph, further the partition-creating unit (500) gets a list of partition path sorted by the cost. The algorithm will cut the graph into several sub-graphs that can fit into hardware limitation base on the partition path sorted by the cost above.

The system (100) for partitioning a neural network graph further includes a sub-graph generator (600) configured for generating a series of sub-graphs based on the partition path sorted by the partition-creating unit (500) based on graph costfunc partition algorithm.

The system (100) for partitioning a neural network graph further includes a sub-graph optimizer (700) configured for optimizing the sub-graph by searching hyper-parameter computational node limit in the sub-graph. A valid cut is determined, as a current cut does not break any existing section checker rule. If the lowest cost route does not break the sub-graph checker and it is a valid cut, a further a series of cut-based check is done on this cut until the end of the graph.

In one embodiment of the present invention, the sub-graph generated may be also called as section. The section checker may be rule based. The rules are registered and grouped by category. The section checker checks byte tensor move mask and weight overflow and check the byte tensor direct memory access input and output overflow. The section checker also check the overlap buffer size overflow and check the data buffer of node input values and node output values size overflow.

The section checker performs check to ensure the input tensor and output tensor numbers are less than a predetermined limit. The section checker also checks the memory access rules. The section or sub-graph output is not used by section nodes. Moreover, the section checker checks the input tensor shape. The section checker also check the output tensor stripe size for the section and return an error if it fails.

The sub-graph optimizer (700) further assigns at least single assignment workflows to the multiple sub-graph depending upon selection of scheduling parameters. The scheduling parameters like stripe size assigned to the sub-graph. Stripe size assignment workflows may include setting the sub-graph's stripe size, represented as direct memory access input tensor stripe size.

In the directed acyclic graph, sub-graphs have a direct memory access input tensor and direct memory access output tensor defined at the outset. The workflow may determine the hardware attributes based on the input tensor stripe size, output tensor stripe size, input node stripe size, output node stripe size, byte tensor move mask and weight usage, overlap buffer size and data buffer of node input values and node output values. The workflow may assign the section input tensor stripe based on section first input tensor. The normal stripe sizes may be set for the input node stripe size and output node stripe size.

Figure 2:
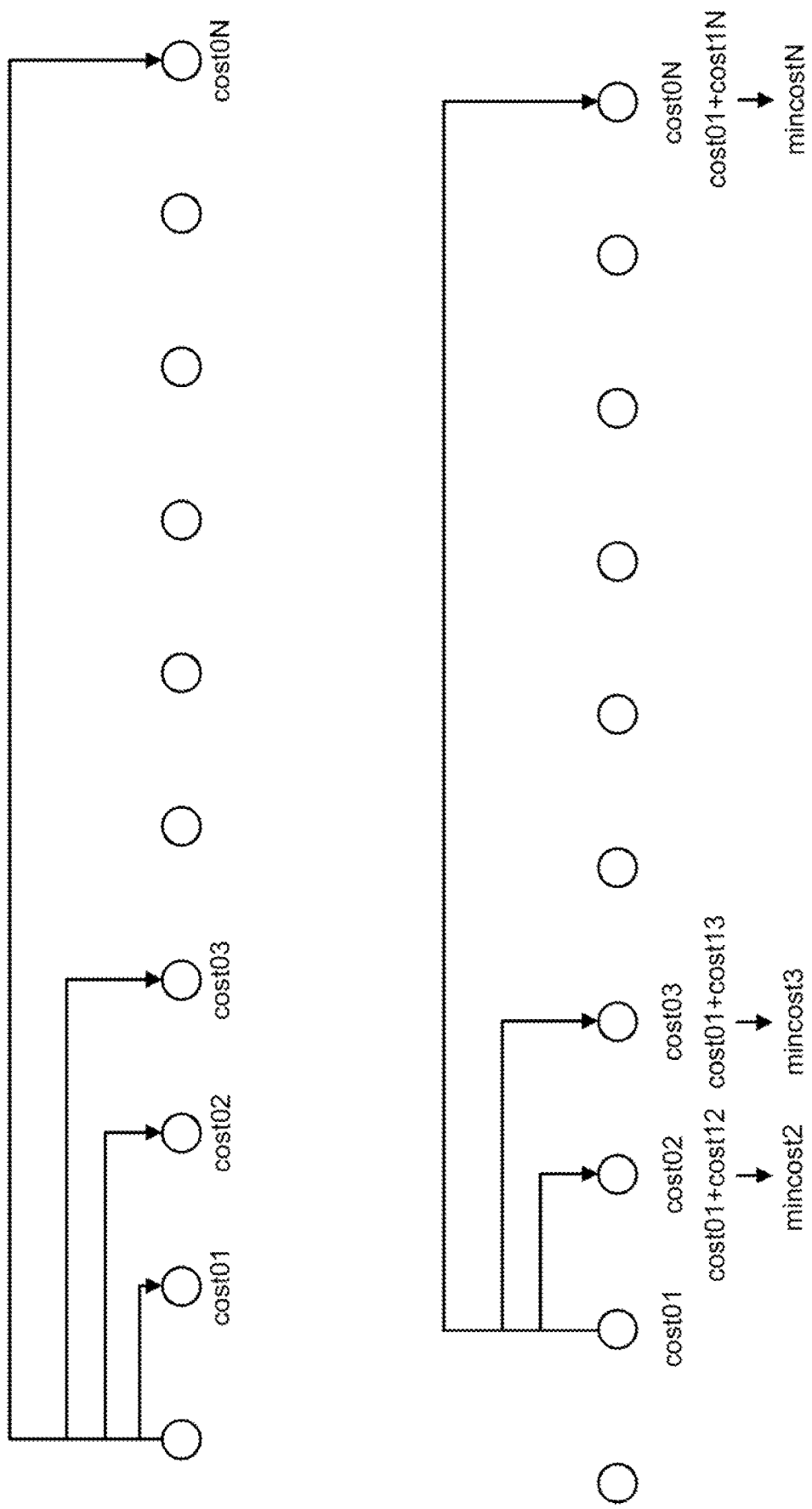
FIG. 2 illustrates a partition-creating unit of the graph partitioning system in accordance with present invention.

FIG. 2 illustrates a partition-creating unit in accordance with the present invention. The partition-creating unit (500) configured for making a partition of the neural network-based graph based on cost function defined and internal memory limitation of the hardware. The partition-creating unit (500) generates a partition boundary within the neural network graph based on cost function between the two nodes of the neural network-based graph.

The partition-creating unit (500) based on graph costfunc partition algorithm generates all the cost between two nodes generated by the node generating unit (200). Firstly, the looping starts from the first node, it will loop all the remaining N-1 nodes. Further, the current cost corresponding for each node from node 0 is saved in the database.

The partition-creating unit (500) based on graph costfunc partition algorithm again starts loop start from the second node, and loop all the remaining N-2 nodes and farther identifies current cost corresponding for each node. For each node, the partition-creating unit (500) compares the current cost with the saved cost and get a sorted partition path with lowest cost.

The partition-creating unit (500) based on graph costfunc partition algorithm loops to the last node of the graph, further the partition-creating unit (500) gets a list of partition path sorted by the cost. The algorithm will cut the graph into several sub-graphs that can fit into hardware limitation base on the partition path sorted by the cost above.

The cost function defined as estimated computation time and memory bandwidth of partitioned sub-graph. By using such cost function, it is easy to calculate the lowest cost between a start node and any end node in a sub-graph. By using efficient soiling algorithm, we can get the lowest cost for any node. The graph costfunc partition algorithm calculate the lowest cost route beginning from a starting point to any end node, and to exclude longer distances when making an update. The partition-creating unit (500) further assigns a lowest cost route between the two nodes among multiple nodes. The partition-creating unit (500) generates a multiple partition path sorted by the cost function between multiple nodes.

Figure 3:
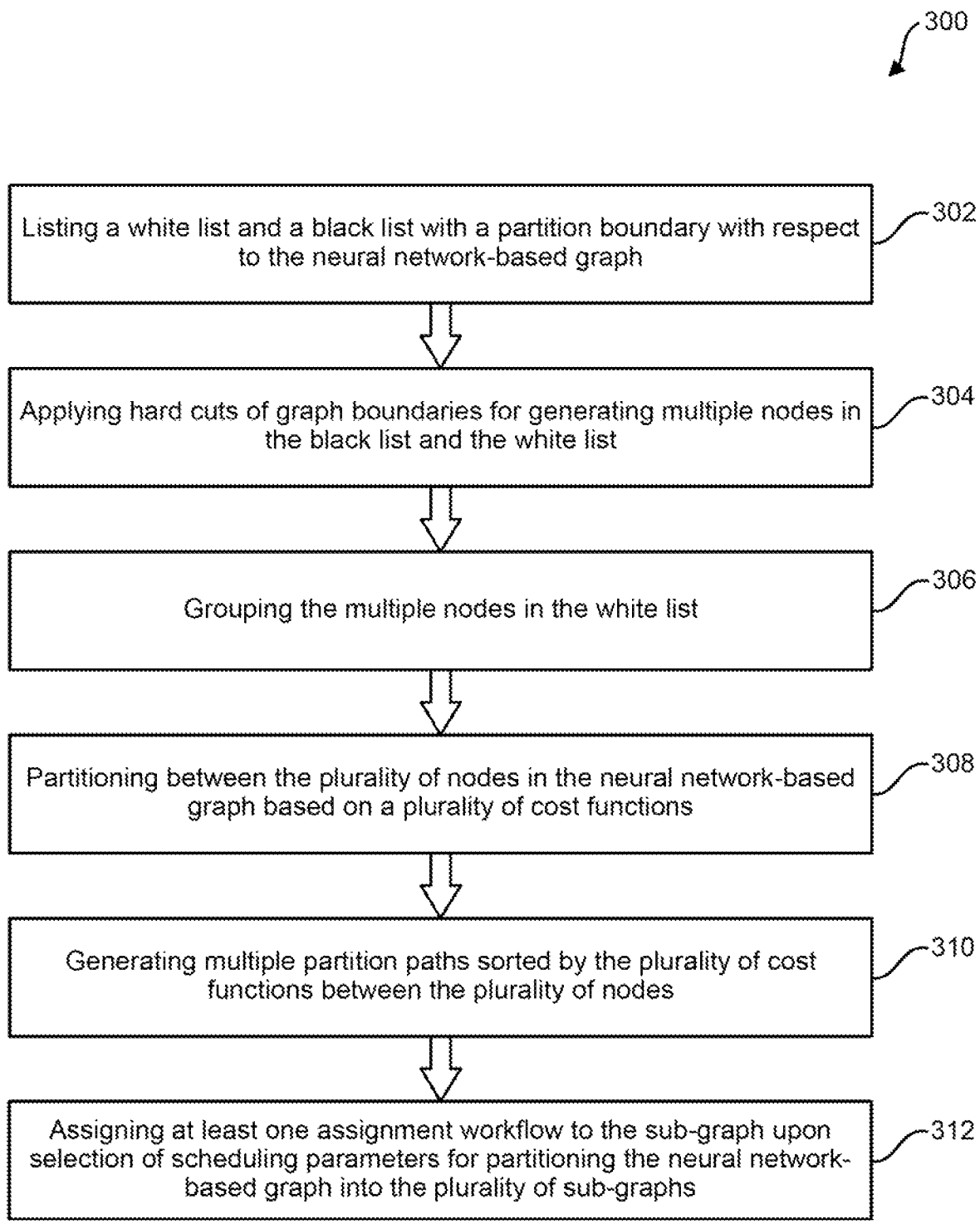
FIG. 3 illustrates a method for partitioning a neural network graph in accordance with present invention.

FIG. 3 illustrates a method for partitioning a neural network graph into a series of sub-graphs in accordance with the present invention. The method (300) includes a step (302) of listing of a white list and a black list, partition boundary with respect to the neural network graph. The method (300) further includes a step (304) of applying hard cuts of graph boundary for generating multiple nodes in the black list and the white list. The nodes in the black list represent a partition boundary.

The method further (300) includes a step (306) of optimization grouping of the multiple nodes in the white list for known good partition points. The method (300) further includes a step (308) of partitioning by generating a partition boundary within the within the neural network graph based on cost function between the two nodes.

The method (300) further includes a step (310) of generating multiple partition path sorted by the cost function between the multiple nodes, generating multiple sub-graph based on the partition path sorted by the cost function between the multiple nodes. The method (300) further includes a step (312) of assigning single assignment workflows to the respective sub-graph upon selection of scheduling parameters.

The scheduling parameters like stripe size assigned to the sub-graph. Stripe size assignment workflows may include setting the sub-graph's stripe size, represented as direct memory access input tensor stripe size. In the directed acyclic graph, sub-graphs have a direct memory access input tensor and direct memory access output tensor defined at the outset.

The workflow may determine the hardware attributes based on the input tensor stripe size, output tensor stripe size, input node stripe size, output node stripe size, byte tensor move mask and weight usage, overlap buffer size and data buffer of node input values and node output values. The workflow may assign the section input tensor stripe based on section first input tensor. The normal stripe sizes may be set for the input node stripe size and output node stripe size.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

The invention claimed is:

1. A method for partitioning a neural network-based graph into a plurality of sub-graphs using a cost function based parameter search, the method comprising:
    listing a white list and a black list with a partition boundary with respect to the neural network-based graph;
        applying hard cuts of graph boundaries for generating multiple nodes in the black list and the white list, wherein the nodes in the black list represent a partition boundary and the nodes in the white list cannot be considered as graph partition boundary;
        grouping the multiple nodes in the white list;
        partitioning between the plurality of nodes in the neural network-based graph based on a plurality of cost functions;
        generating multiple partition paths sorted by the plurality of cost functions between the plurality of nodes, wherein a cost function algorithm generates the cost between the nodes starting from the first node and looping through all the remaining N-1 nodes;
    assigning at least one assignment workflow to the sub-graph upon selection of scheduling parameters for partitioning the neural network-based graph into the plurality of sub-graphs, wherein the assigning at least one assignment workflow is applied to accelerators and chips including a DSP chip, a neural networks chip, or an AI chip; and
        reducing power consumption of the accelerators and the chips due to the plurality of sub-graphs.

2. The method in accordance with claim 1, wherein the at least one assignment workflow determines a plurality of hardware attributes based on at least one of an input tensor stripe size, an output tensor stripe size, an input node stripe size, an output node stripe size, a byte tensor move mask and weight usage, an overlap buffer size and a data buffer of node input values and node output values.

3. The method in accordance with claim 1, wherein the plurality of cost functions are used to calculate lowest cost between a start node and an end node in a sub-graph.

4. The method in accordance with claim 1, further comprising checking, with the accelerators and the chips, a byte tensor move mask, a weight overflow, a byte tensor direct memory access input, an output overflow, an overlap buffer size overflow, a data buffer of node input values, a set of memory access rules of the plurality of sub-graphs.

5. The method in accordance with claim 1, further comprising checking, with the accelerators and the chips, an output tensor stripe size and an input tensor shape of the plurality of sub-graphs.

6. The method in accordance with claim 4 or claim 5, further comprising categorizing, with the accelerators and the chips, a number of preset rules.

7. A computer program product comprising a non-transitory computer useable medium having computer program logic for enabling at least one processor in a computer system partitioning a neural network-based graph into a plurality of sub-graphs, said computer program logic comprising:
    listing a white list and a black list with a partition boundary with respect to the neural network-based graph;
        applying hard cuts of graph boundaries for generating multiple nodes in the black list and the white list, wherein the nodes in the black list represent a partition boundary and the nodes in the white list cannot be considered as graph partition boundary;
        grouping the multiple nodes in the white list;
        partitioning between the plurality of nodes in the neural network-based graph based on a plurality of cost functions;
        generating multiple partition paths sorted by the plurality of cost functions between the plurality of nodes, wherein a cost function algorithm generates the cost between the nodes starting from the first node and looping through all the remaining N-1 nodes;
    assigning at least one assignment workflow to the sub-graph upon selection of scheduling parameters for partitioning the neural network-based graph into the plurality of sub-graphs wherein the assigning at least one assignment workflow is applied to accelerators and chips including a DSP chip, a neural networks chip, or an AI chip; and
        reducing power consumption of the accelerators and the chips due to the plurality of sub-graphs.

* * * * *